US012646847B2

(12) United States Patent
Ludois et al.

(10) Patent No.: US 12,646,847 B2
(45) Date of Patent: Jun. 2, 2026

(54) ANTENNA SYSTEM WITH QUALITY-FACTOR MODULATION

(71) Applicant: Wisconsin Alumni Research Foundation, Madison, WI (US)

(72) Inventors: Daniel Ludois, Middleton, WI (US); Nader Behdad, Oregon, WI (US); Marisa Liben, Westminster, CO (US); Mirhamed Mirmozafari, Waunakee, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 300 days.

(21) Appl. No.: 18/368,080

(22) Filed: Sep. 14, 2023

(65) Prior Publication Data

US 2025/0096473 A1 Mar. 20, 2025

(51) Int. Cl.
*H01Q 9/02* (2006.01)
*H01Q 9/06* (2006.01)

(52) U.S. Cl.
CPC .................................... *H01Q 9/06* (2013.01)

(58) Field of Classification Search
None
See application file for complete search history.

(56) References Cited

U.S. PATENT DOCUMENTS

| | | | | |
|---|---|---|---|---|
| 9,819,394 | B2 * | 11/2017 | Shana'a | H04B 5/24 |
| 11,532,999 | B2 * | 12/2022 | Leibl | H03K 17/08148 |
| 2013/0115876 | A1 * | 5/2013 | McFarthing | H01Q 1/2216 455/41.1 |
| 2021/0091767 | A1 * | 3/2021 | Cairoli | H03K 17/063 |
| 2023/0014041 | A1 * | 1/2023 | Pigoso Destro | H01Q 9/42 |

FOREIGN PATENT DOCUMENTS

| | | | | | |
|---|---|---|---|---|---|
| CN | 201112557 | Y | * | 9/2008 | |
| CN | 103684502 | A | * | 3/2014 | H03H 7/38 |
| CN | 106982076 | A | * | 7/2017 | H04B 1/401 |
| CN | 116599539 | A | * | 8/2023 | H04B 1/04 |

OTHER PUBLICATIONS

Parfenovich, Electrically Small Antenna Design Specifics, UNIC Lab (Year: 2021).*

* cited by examiner

*Primary Examiner* — Mohammed Rachedine
(74) *Attorney, Agent, or Firm* — Boyle Fredrickson, S.C.

(57) ABSTRACT

An electrically small antenna system modulates the Q factor of the antenna during electrical transmission to decrease the Q factor during signal transitions between frequency states thereby affecting an improved trade-off between antenna bandwidth and operating efficiency.

15 Claims, 4 Drawing Sheets

ANTENNA SYSTEM WITH QUALITY-FACTOR MODULATION

STATEMENT REGARDING FEDERALLY SPONSORED RESEARCH OR DEVELOPMENT

This invention was made with government support under N66001-22-C-4508 awarded by the Naval Information Warfare Center Pacific. The government has certain rights in the invention.

CROSS REFERENCE TO RELATED APPLICATION

Background of the Invention

The present invention relates to electrically small antennas for transmitting radio signals and, in particular, to a method of operating an electrically small antenna to improve its bandwidth-efficiency product.

An electrically small antenna (ESA) refers to an antenna or antenna element with relatively small geometrical dimensions compared to a wavelength of the electromagnetic fields that the antenna radiates. As the electrical dimensions of an antenna are decreased, the radiation efficiency and bandwidth also decrease. ESAs have very large quality factors (Q) because their radiation resistance is low relative to a reactance in an antenna circuit. A large Q diminishes a speed and a fidelity that data can be encoded into a signal, thereby lowering the bandwidth of an ESA system. For example, it is difficult to quickly change an amplitude or a phase of a signal in a high-Q system.

Though it is tempting to design an ESA system with a low Q, for example, by adding a series resistance to the antenna, this would undesirably increase antenna losses, reducing transmission efficiency.

SUMMARY OF THE INVENTION

The present inventors have recognized that for common digital modulation schemes, the bandwidth demands on the antenna change significantly and predictably at junctions between symbols. This creates the opportunity to dynamically reduce the Q of the antenna at symbol transitions to increase the speed of transition while maintaining the antenna in an efficient high-Q state at other times.

In one embodiment, the Q of the antenna is controlled by switching a resistor into series with the antenna at these transition times. In an alternative embodiment, the amplifier connected to the antenna may be used to simulate such a resistance. Importantly, these solutions can provide improved bandwidth with reduced loss in efficiency More specifically, the invention may provide an electrically small antenna system for use with a digitally modulated radio and having an antenna output adapted to connect to and control a current through an antenna radiator and having a radio signal input receiving a radiofrequency signal being a function of an encoding signal defining a series of digital symbols transmitted at symbol times separated at transition times. An antenna driver circuit operates to apply power to a connected antenna radiator during symbol times and to dissipate power from the antenna radiator during transition times by changing an effective resistance in a path through the antenna radiator to lower the electrical Q of the connected antenna driver circuit and antenna radiator.

It is thus a feature of at least one embodiment of the invention to improve the antenna bandwidth efficiency product by changing the normally static Q value of the antenna dynamically according to transitions between symbols. This dynamic adjustment of Q allows an improved compromise between signal bandwidth (how quickly the signal can be changed) which increases with low values of Q, and antenna efficiency (how much power is consumed) which increases with high values of Q in ESAs.

In one embodiment, the effective resistance is a physical resistor switched into series with the antenna to increase its effective series resistance by at least 10%.

It is thus a feature of at least one embodiment of the invention to provide an extremely simple mechanism for dynamically adjusting Q that can be added to a wide variety of amplifier types without significant amplifier modification.

In this embodiment, the antenna driver circuit may provide a semiconductor switch in parallel with the electrical resistor operating to shunt the electrical resistor outside of transition times.

It is thus a feature of at least one embodiment of the invention to provide a method of rapidly switching a resistor into and out of a series configuration with the antenna.

In an alternative embodiment of the invention, the effective resistance for changing the Q of the antenna is provided by an amplifier communicating with a current monitor that monitors current along the path in series with the antenna radiator. The amplifier operates during transition times to provide an output voltage that changes as a function of the monitored current to dissipate power in the antenna radiator, for example, controlling voltage to oppose current flow so that the amplifier reabsorbs the power.

It is thus a feature of at least one embodiment of the invention to simulate the effective resistance using an amplifier which, unlike a resistor, may recapture the energy removed from the antenna during the transition.

The amplifier may also use the monitored current to boost power in the antenna radiator during the symbol times.

It is thus a feature of at least one embodiment of the invention to improve symbol transitions by both boosting and dissipating power as appropriate.

The digital encoding signal may define a digital modulation selected from amplitude-shift keying, frequency-shift keying, phase-shift keying, or a combination of amplitude and phase, amplitude and frequency, or phase and frequency shift keying.

It is thus a feature of at least one embodiment of the invention to provide a system that boosts bandwidth efficiency product for a variety of common modulation techniques.

These particular objects and advantages may apply to only some embodiments falling within the claims and thus do not define the scope of the invention.

DETAILED DESCRIPTION OF THE PREFERRED EMBODIMENT

Figure 1:
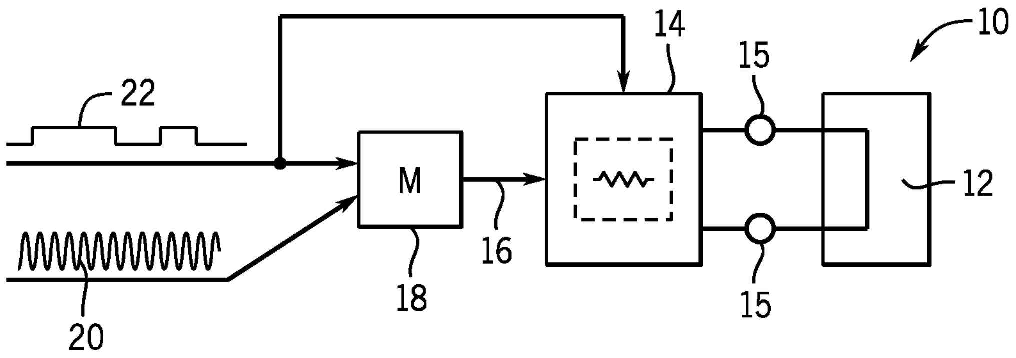
FIG. 1 is a block diagram of the principal components of a radio transmitter incorporating the present invention providing an antenna driver circuit that receives a radio signal input and controllably places an effective resistance in series with an antenna at a time during transition of symbols.

Referring now to FIG. 1, an antenna system 10 according to the present invention may provide an electrically small antenna (ESA) 12 serving to radiate radiofrequency energy into free space. The ESA 12 may be connected to a Q-modifying antenna driver circuit 14 through terminals 15, the Q-modifying antenna driver circuit 14 receiving an input radio signal 16. It will be appreciated that this is a simplified depiction of an antenna circuit for the purpose of explanation. A single terminal antenna will have only one wire connected to the amplifier and its second terminal will be field coupling to the earth.

The input radio signal 16 may be, for example, in the high-frequency and very high-frequency ranges from 3 to 300 MHz with wavelengths from 100 to 1 m and may be developed by a modulator 18 receiving a carrier signal 20 and an encoding signal 22 to produce the input radio signal 16 which will be used for transmission. Typically the frequency of the carrier signal 20 will be more than 10-100 times that of the encoding signal 22. The encoding signal 22 is a digital signal, for example, providing binary values controlling the modulator 18 to convert the binary values into a series of symbols expressed as a radiofrequency phase, frequency, or amplitude imposed on the carrier signal 20.

In the simple case described here for clarity, each symbol will be represented by a single dimension of phase, frequency, or amplitude; however, in a more general case to which the invention is applicable, multiple modulators 18 and carrier signals 20 may be used so that the symbols may be expressed in multiple simultaneous bands, and/or the modulator(s) 18 may provide multiple modulation levels (for example, different levels of amplitude, phase, or frequency), and types of modulation can be combined to define a "constellation" of different symbols generated by the encoding signal 22. It should be understood that the modulator 18 may receive a carrier signal 20 only in a logical sense and may in fact synthesize the necessary radio signal 16 from a defined carrier signal and the encoding signal 22.

Referring still to FIG. 1, the ESA 12 will be an antenna whose physical size is generally less than 1/10 the wavelength of the carrier signal and/or may be an antenna where the antenna radiator conforms to the following equation:

$$ka<1$$

where $k=2\pi/\lambda$ where $\lambda$ is the maximum wavelength of the driving signal and a is the radius of a smallest sphere (the imaginary Chu sphere) circumscribing the antenna radiator.

Figure 2:
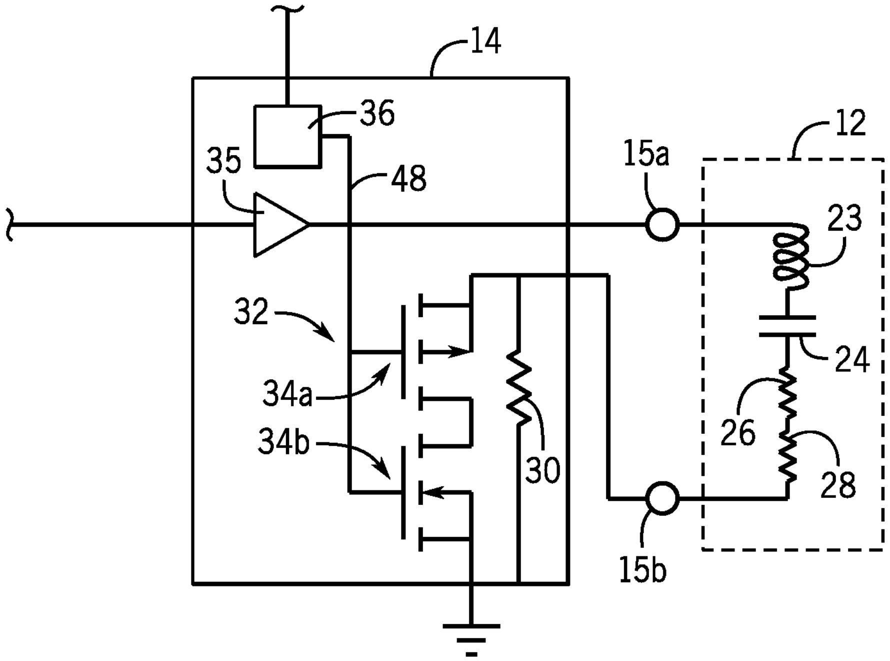
FIG. 2 is a first embodiment of the invention employing a physical resistor that is electronically switched in the series with the antenna.

Referring now to FIG. 2, the ESA 12 will have an intrinsic and distributed inductance 23 and capacitance 24 and resistance 26 being a function of the physical construction of the ESA 12 including its dimension, shape, and materials. The ESA 12 will also have a resistance of radiation 28, the latter representing an energy radiated into free space as part of the radio transmission. A characteristic of an ESA 12 is a high-antenna Q resulting from the low effective resistance of radiation 28 of a small antenna design which lowers the total resistance when compared to its intrinsic and distributed inductance 23 and capacitance 24. Qualitatively, a high-Q antenna tends to "ring," interfering with a rapid transition between symbols, whereas the low-Q antennas are heavily damped improving transition times but dissipating electrical energy to lower antenna efficiency. The depicted model is the only one circuit model of an antenna and thus should not be considered a limitation to application of the invention which will operate with a wide variety of high Q antennas.

Referring now to FIG. 2, in a first embodiment, the antenna driver circuit 14 may provide for a damping resistor 30 that may be switched into and out of series connection with the ESA 12 to boost or reduce the effective series resistance of the ESA 12. The switching may be accomplished using a solid-state switch 32 comprising, in this example, of a pair of anti-series connected silicon carbide MOSFETs 34*a* and 34*b* (N-channel) acting as a four-quadrant switch to shunt or short the resistor 30 when the resistor 30 is to be removed from series connection with the ESA 12, and to open across the resistor 30 to add the resistor 30 to series with the ESA 12. The invention contemplates that if necessary, auxiliary passive components may be placed in parallel with switches 34*a* and 34*b* to reduce the effect of their parasitic capacitances in the shunting operation. Additionally, the invention contemplates that other high-speed switches may also be used including MEMs switches, electro-optical switches and the like. When the resistor 30 is used to lower the Q of the ESA 12, it can be placed anywhere in series along a path from an amplifier 35 through a first terminal 15*a*, through the ESA 12, and back through the terminal 15*b* to ground. Generally, the size of the resistor 30 will be selected to change the Q of the ESA 12 by more than 10%. In the case of a single wire antenna, discussed above, the resistor 30 may be placed in the current path on the on the high side, not the grounded side of the amplifier output. The primary antenna embodiment described herein is a series RLC equivalent resonant circuit, however parallel equivalent circuits or combinations therein are also relevant. In the event of a parallel resonant circuit, the resistor is switched in and out of being in shunt with the antenna tank to raise or lower the effective antenna Q at the appropriate moment. This is the "dual" of the series configured antenna. Note that the series configuration the resistance will be a larger value, and in the parallel configuration the resistor will be a smaller value. Regardless of configuration, the resistor switched or inserted into the circuit lowers the Q.

Control of the gates of the MOSFETs 34 is provided by a transition detector 36 most simply communicating with the encoding signal 22 (shown in FIG. 1) to identify transitions between symbols.

Figure 3:
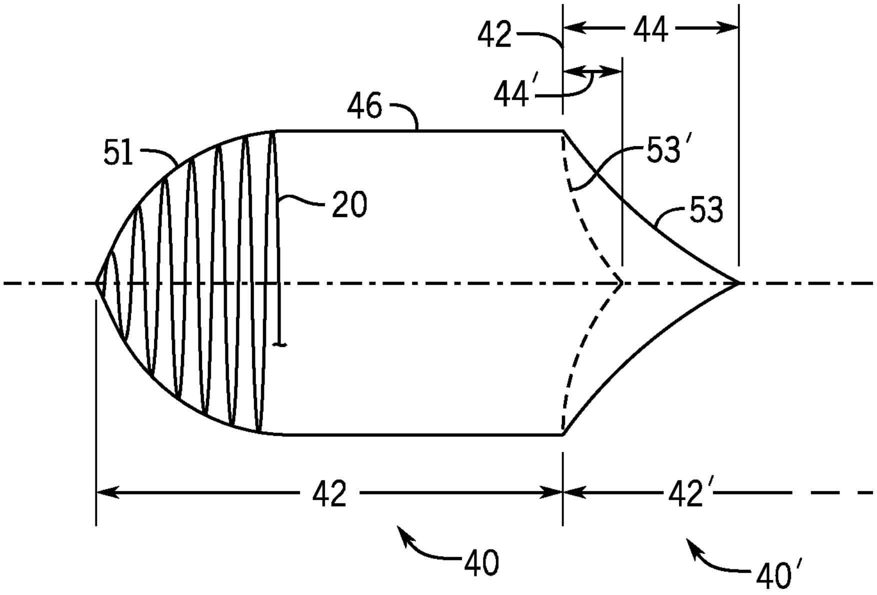
FIG. 3 is a sample modulated carrier signal showing modulation with a high-Q antenna during a symbol time and transition time, and showing (in dotted lines) modulation during those same times with the antenna switched to a low-Q mode during a symbol transition time.

Referring to FIGS. 2 and 3, a given symbol 40 may be transmitted during symbol transmission time 42 terminating at symbol transition time 44. With a fixed, high-Q ESA 12, the envelope 46 of this symbol will exhibit a conventional exponential or first-order time constant rise profile 51 during symbol transmission time 42 with an approximately equal length decay profile 53 at the conclusion of the current symbol transmission time 42. This decay profile 53 will extend by a transition time 44 into the next consecutive symbol transmission time 42 interfering with interpretation of the symbol 40 during that time.

In the present invention, the transition detector 36 (shown in FIG. 2), detects when the symbol 40 is followed by a different symbol 40' (having a different amplitude, phase, frequency, or combination of parameters) to generate a gate control signal 48 (shown in FIG. 2) during a shortened symbol transition time 44', turning off the MOSFETs 34 to switch resistor 30 in the series with the antenna 12. This resistor 30, which lowers the Q of the ESA 12, depletes energy from the ESA 12 during the shortened transition time 44' to provide a faster decay time 53' permitting development of the next symbol 40' more quickly without interference. The length of the gate control signal 48 equaling the shortened transition time 44' may be determined based on knowledge of the improved (lowered) Q of the system according to the value of the resistor 30.

This technique is particularly useful when the amplifier 35 is a class E or similar type of amplifier in which a solid-state switching circuit is followed by a tank circuit where the ability to quickly dissipate power in the antenna, passively, is weakened by the interposition of the tank circuit between the amplifier 35 and the antenna 12 and its inherent energy storage. Both class E and class D amplifiers, however, can be used regeneratively in this context through closed-loop control. The use of the resistor 30 also simplifies the amplifier design and reduces power dissipation in power-limited amplifier semiconductor elements, for example, in a linear amplifier.

Figure 4:
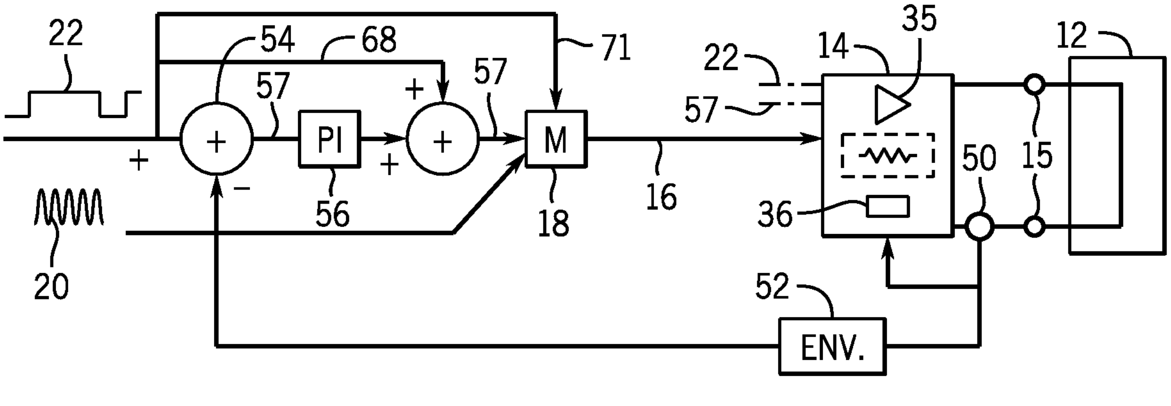
FIG. 4 is a figure similar to FIG. 2 showing a second embodiment using an amplifier to simulate a resistor by adjusting the amplifier output according to measured current.

Referring now to FIG. 4, the same principle of adjusting Q for improved antenna performance can be implemented without a physical resistor by using the amplifier of the antenna driver circuit 14 to simulate an added series resistance. The simulation operates the amplifier to control its output voltage to buck current flow through the ESA 12 in the manner of a resistor which presents a rising voltage drop that opposes current flow.

In order to implement this simulation, a current sensor 50 is placed in the path from the driver circuit 14 through the terminals 15 and ESA 12, essentially measuring the antenna current. In this case, the transition detector 36 operates to change a control of the amplifier 45 being controlled by a current envelope developed from the encoding signal 22, to being controlled by the current flow measured by the current sensor 50, specifically to create a voltage resisting the current flow.

Referring still to FIG. 4, the encoding signal 22 in this embodiment may be used to define a current envelope of the carrier signal 20 describing the desired symbol. This current envelope is then used to control the antenna driver circuit 14 through a current feedback loop. In this loop, current measured by the current sensor 50 is applied to envelope follower 52, for example, a rectifier and low-pass filter or RMS extraction circuit. The envelope follower 52 converts a rapid AC waveform of current mirroring the RF transmission to its average peak value.

The extracted envelope from the envelope follower 52 is subtracted from the current envelope described by the encoding signal 22 at summing junction 54 to produce a current error value. This current error value may then be provided to a proportional integral (PI) controller 56 of a type known in the art and the output of the PI controller 56 provided to an amplitude control of the modulator 18. A feedforward path 68 may optionally be provided from the input of the summing junction 54 bypassing the PI controller 56 allowing more sophisticated tuning of the system for fast response at symbol transition times 44.

When the modulator 18 is performing amplitude modulation for the development of symbols, this output downstream from the PI controller 56 may be the only input to the modulator 18, otherwise it is an additional modulation factor together with a separate input 71, for example, describing a desired phase or frequency. The modulator 18 modifies an associated carrier signal 20 to provide the radio signal 16 an input to the antenna driver circuit 14 as in the example of FIG. 1.

During steady-state operation during the symbol transmission time 42, this envelope controlled output of the modulator 18 drives the amplifier 45 of the driver circuit 14 to provide the desired current envelope through the ESA 12 matching the input current envelope value.

The transition detector 36 detects transition times 44 by monitoring the encoding signal 22 to detect transition between symbols or may simply monitor the error signal 57 from the summing junction 54 which will indicate a transition time 44 from a negative error value indicating that the actual current envelope through the ESA 12 is above the commanded current envelope. At these times, when energy should be depleted from the ESA 12, the transition detector 36 switches the control of amplifier 35 from the output of the modulator 18 to a value derived from the current sensor 50 (for example, with 180° phase shift) to buck current flow measured by current sensor 50 and thus to quickly extract energy in the ESA 12.

Figure 5:
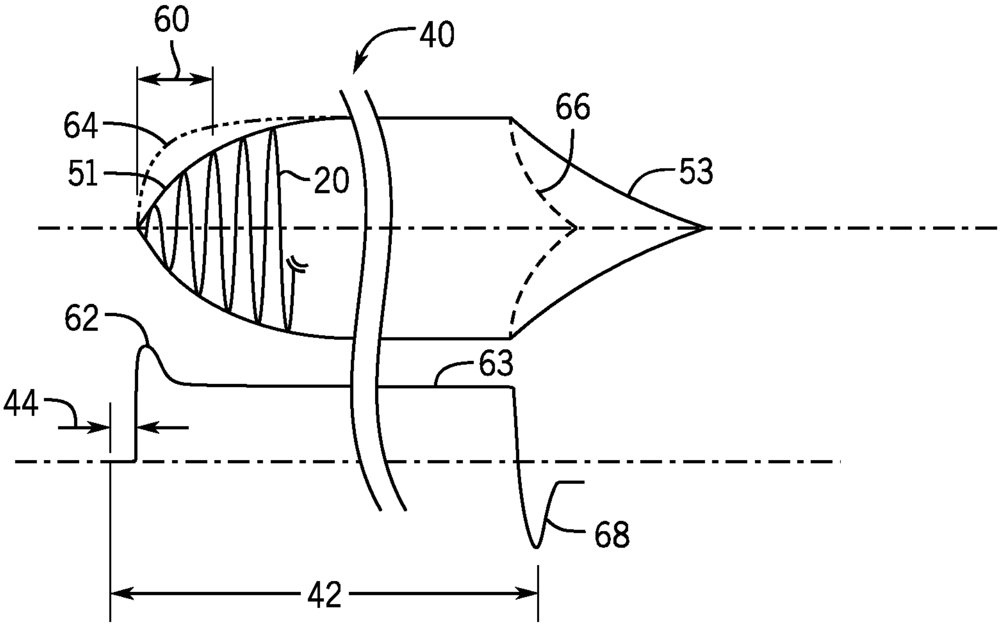
FIG. 5 is a figure similar to FIG. 3 showing the ability to use the amplifier and measured current to both boost and dissipate energy in the antenna.

Referring now to FIG. 5, in this embodiment, at the beginning of a symbol 40, the current feedback response to the delayed current rises during the first order or exponential time constant rise profile 51 at time 60 to provide a boost power 62 (above the steady-state power 63) provided by the amplifier during that time, shortening the rise time as indicated by dotted line 64. The transition detector 36 will operate to prevent this boost power 62 until after the symbol transition time 44' from the previous symbol being a point in time in which the transition detector 36 restores control of the amplifier 35 to the modulator 18.

Conversely, at the end of the symbol transmission time 42, rapid decay of the antenna signal supplanting the typical decay profile 53 and as indicated by dotted line 66 is provided by an energy withdrawal provided by phasing the voltage in opposition to the current for negative power flow 68 from the ESA 12 indicated during absorption time. Importantly, the energy withdrawal 68 may be regenerated or stored by the amplifier 35 for subsequent use through the use of a regenerative-type amplifier.

Figure 7:
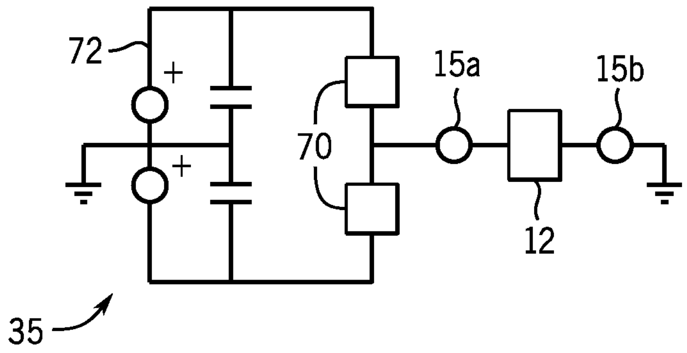
FIG. 7 is a block diagram of a half-bridge amplifier suitable for use with the present invention.
Figure 8:
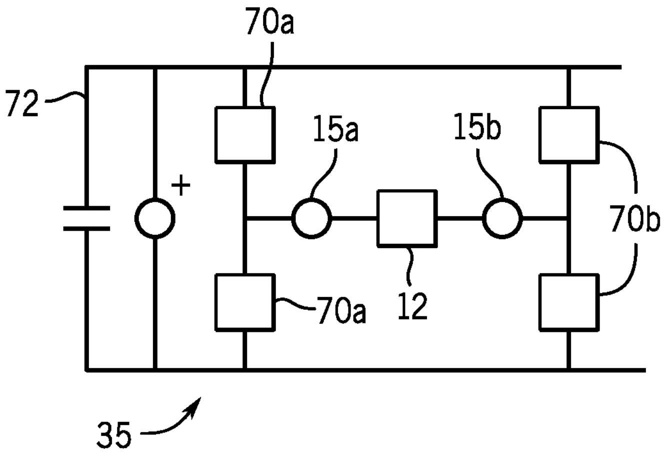
FIG. 8 is a block diagram similar to FIG. 6 of a full-bridge amplifier suitable for use with the present invention.

Referring now to FIGS. 7 and 8 a regenerative type amplifier suitable for use with this purpose may adopt either a half-bridge or full-bridge configuration. In FIG. 7, a half-bridge amplifier 35 is shown having series-connected solid-state switches 70 across a DC bus 72. By controlling the timing of the switches 70, a voltage may be developed at terminal 15*a* and 15*b* to transfer power from the DC bus 72 to the antenna 12 during boost times and extract energy for storage in the capacitors of the DC bus 72 during depletion times. FIG. 8 shows a full bridge amplifier 35 in which two sets of series-connected semiconductor switches 70 are used, with the junctions in the series-connected semiconductor switches 78 connected respectively to one of terminal 15*a* and terminal 15*b* communicating with the ESA 12. Both sets of switches 70*a* and 70*b* communicate in parallel to the DC bus 72. Generally, the switches 70 may be gallium nitride semiconductor switches providing low ohm resistance and high switching speeds suitable for RF transmissions.

Figure 9:
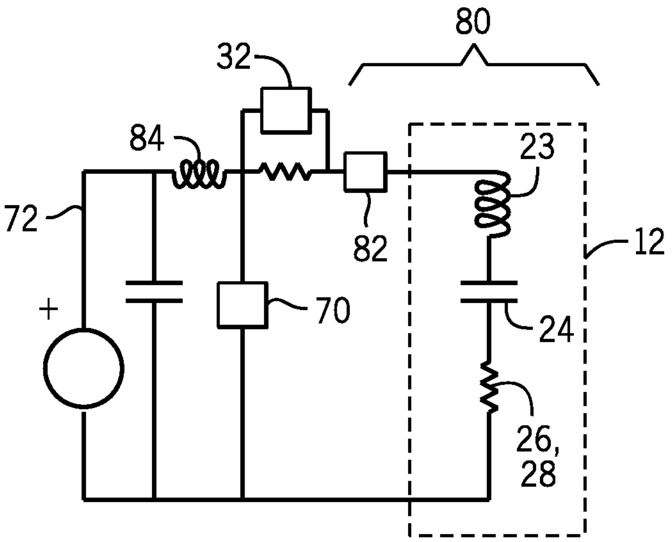
FIG. 9 is a block diagram similar to FIG. 8 showing implementation of the invention in a class-E amplifier.

FIG. 9 shows a class E amplifier providing a solid-state switch 70 across DC bus 72. The output of the DC bus 70 provides a bias inductor 84 presenting a current stiff path at the switching speed of solid-state switch 70. The voltage and current variations produced by the solid-state switch 70 drive a tank circuit 80 formed in part from the impedance of the antenna 12 and in part from a tuning impedance 82 which may be either a capacitor or an inductor depending on the total impedance of the antenna 12. Generally, the tank circuit 80 is tuned either as a series or parallel resonant circuit at a desired radio transmission center frequency. However, the system may operate slightly off resonance to facilitate soft switching, e.g. zero voltage switching or the like, for increased efficiency. The Q-altering resistor 30 may be positioned in series with current flow through the tank circuit 80 and may be shunted by solid-state switch 32 as described above to change the effective Q of the antenna and tank circuit 80 in combination. Alternatively the Class E amplifier may be controlled in a closed loop and/or regenerative fashion as previously described without the Q-altering resistor 30.

Figure 6:
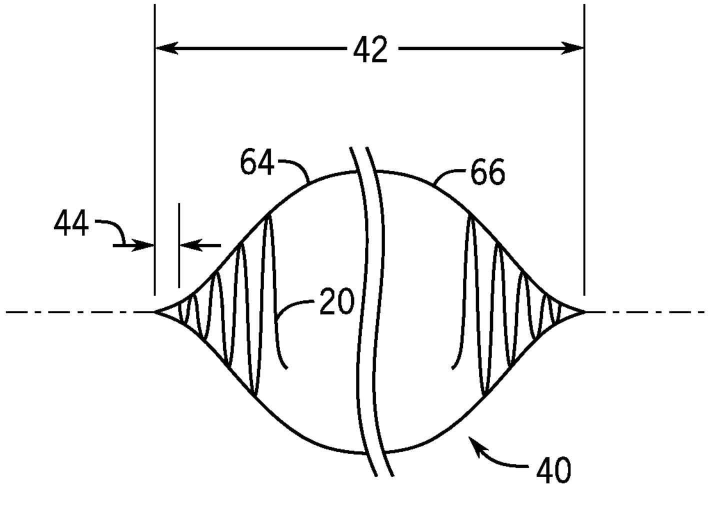
FIG. 6 is a diagram of a pulse-shaped transmission also suitable for use with the present invention.

Referring now to FIG. 6, it will be appreciated that the present invention is applicable not only to modulation systems employing rectangular pulses but also to modulation systems providing for shaped pulses 80 with nonrectangular modulation envelopes. For example, such shaped pulses 80 may be designed to provide band limiting envelope designs approximating a sinc, gaussian, or root-raised-cosine functions. In this case, the transition detector 36 may switch between a boosting mode when the envelope is increasing in amplitude and an energy extracting mode when the envelope is decreasing amplitude based on the error signal 57 from the summing junction 54 to assist in providing the desired current control at any time during the development of the pulse.

Certain terminology is used herein for purposes of reference only, and thus is not intended to be limiting. For example, terms such as “upper”, “lower”, “above”, and “below” refer to directions in the drawings to which reference is made. Terms such as “front”, “back”, “rear”, “bottom” and “side”, describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms “first”, “second” and other such numerical terms referring to structures do not imply a sequence or order unless clearly indicated by the context.

When introducing elements or features of the present disclosure and the exemplary embodiments, the articles “a”, “an”, “the” and “said” are intended to mean that there are one or more of such elements or features. The terms “comprising”, “including” and “having” are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to “a microprocessor” and “a processor” or “the microprocessor” and “the processor,” can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words “means for” or “step for” are explicitly used in the particular claim.

What we claim is:

1. An electrically small antenna system for use with a digitally modulated radio, the system comprising:

an antenna output adapted to connect to and control a current through an antenna radiator;

a radio signal input receiving a radiofrequency signal being a function of an encoding signal defining a series of digital symbols transmitted at symbol times separated at transition times;

an antenna driver circuit operating to apply power to a connected antenna radiator during symbol times and to dissipate power from the antenna radiator during transition times by changing an effective resistance in a path through the antenna radiator to lower an electrical quality factor (Q) of the connected antenna driver circuit and antenna radiator; and wherein the changing of the effective resistance is synchronized with a transition between digital symbols to lower the electrical Q for at least a portion of that transition and less than an entire symbol time.

2. The electrically small antenna system of claim 1 wherein the effective resistance is an electrical resistor switched into the path of current flow through the antenna and increasing the effective resistance along that path by at least 10%.

3. The electrically small antenna system of claim 2 wherein the antenna driver circuit provides a semiconductor switch to insert and remove the electrical resistor into the path of current flow through the antenna to change the electrical Q of the connected antenna driver circuit and antenna radiator.

4. The electrically small antenna system of claim 3 wherein the semiconductor switch is a four-quadrant switch.

5. The electrically small antenna system of claim 3 wherein the antenna driver circuit employs a switch using silicon carbide transistors.

6. The electrically small antenna system of claim 1 wherein the digital encoding signal defines a digital modulation selected from amplitude-shift keying, frequency-shift keying, and phase-shift keying.

7. The electrically small antenna system of claim 1 further including a radio antenna connected to the antenna output.

8. The electrically small antenna system of claim 1 wherein the antenna radiator has a largest dimension no more than 1/10 of a maximum wavelength of the driving signal.

9. The electrically small antenna system of claim 1 wherein the antenna radiator conforms to the following equation:

$$ka<1$$

where $k=2\pi/\lambda$ where $\lambda$ is the maximum wavelength of the driving signal and a is the radius of an imaginary Chu sphere circumscribing the antenna radiator.

10. The electrically small antenna system of claim 1 wherein including a modulator receiving a carrier signal and the encoding signal to modulate the carrier signal to produce the radio signal input.

11. The electrically small antenna system of claim 10 wherein the modulator provides digital modulation selected from amplitude-shift keying, frequency-shift keying, and phase-shift keying.

12. An electrically small antenna system for use with a digitally modulated radio, the system comprising:

an antenna output adapted to connect to and control a current through an antenna radiator;

a radio signal input receiving a radiofrequency signal being a function of an encoding signal defining a series of digital symbols transmitted at symbol times separated at transition times;

an antenna driver circuit operating to apply power to a connected antenna radiator during symbol times and to dissipate power from the antenna radiator during transition times by changing an effective resistance in a path through the antenna radiator to lower an electrical quality factor (Q) of the connected antenna driver circuit and antenna radiator; and wherein the effective resistance is provided by an amplifier communicating with a current monitor monitoring current through the antenna radiator, and operating during transition times to provide an output voltage that changes as a function of the monitored current to dissipate power in the antenna radiator.

13. The electrically small antenna system of claim 12 wherein the output voltage changes as a function of the monitored current to oppose the monitored current.

14. The electrically small antenna system of claim 12 wherein the amplifier monitors current through the antenna radiator to boost power in the antenna radiator during the symbol times.

15. The electrically small antenna system of claim 12 wherein the amplifier is regenerative to both provide power to the connected antenna and to absorb power from the connected antenna at different times.

* * * * *